Dec. 5, 1967  H. C. SWIFT  3,356,187
LINK SUPPORTED DISK BRAKE
Filed April 25, 1966  3 Sheets-Sheet 1
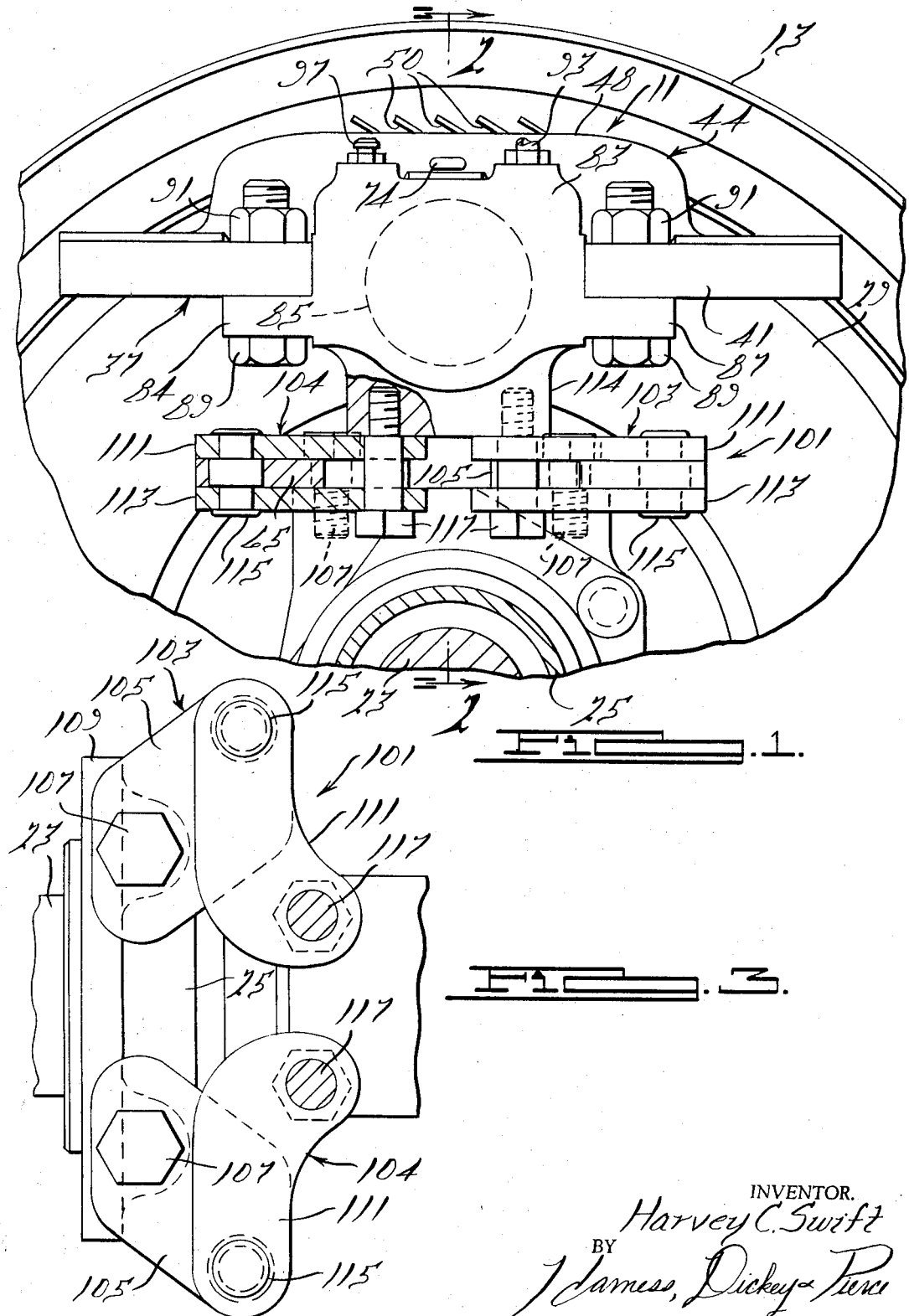
INVENTOR.
Harvey C. Swift
BY
Harness, Dickey & Pierce
ATTORNEYS.

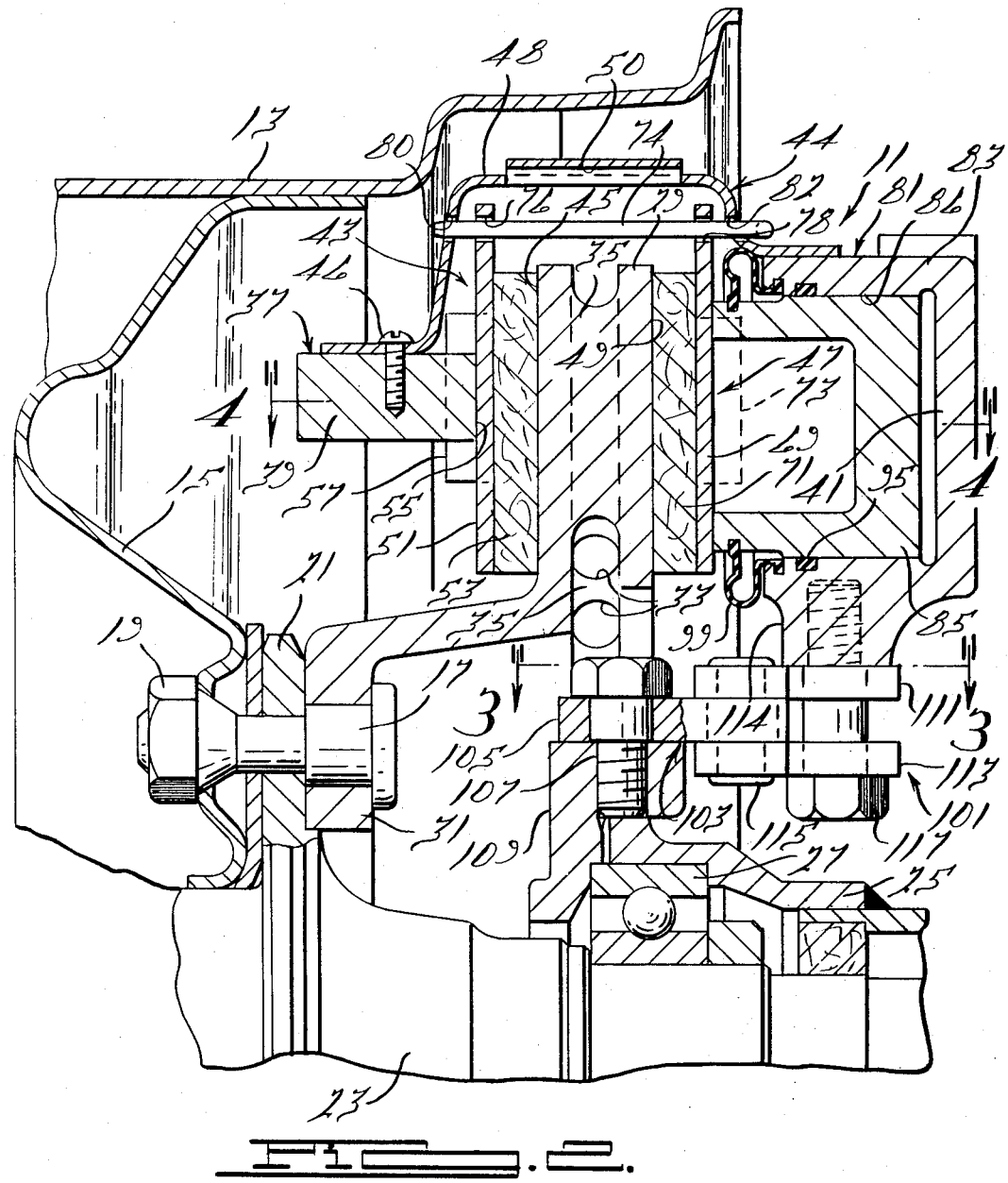

Dec. 5, 1967    H. C. SWIFT    3,356,187
LINK SUPPORTED DISK BRAKE
Filed April 25, 1966    3 Sheets-Sheet 3
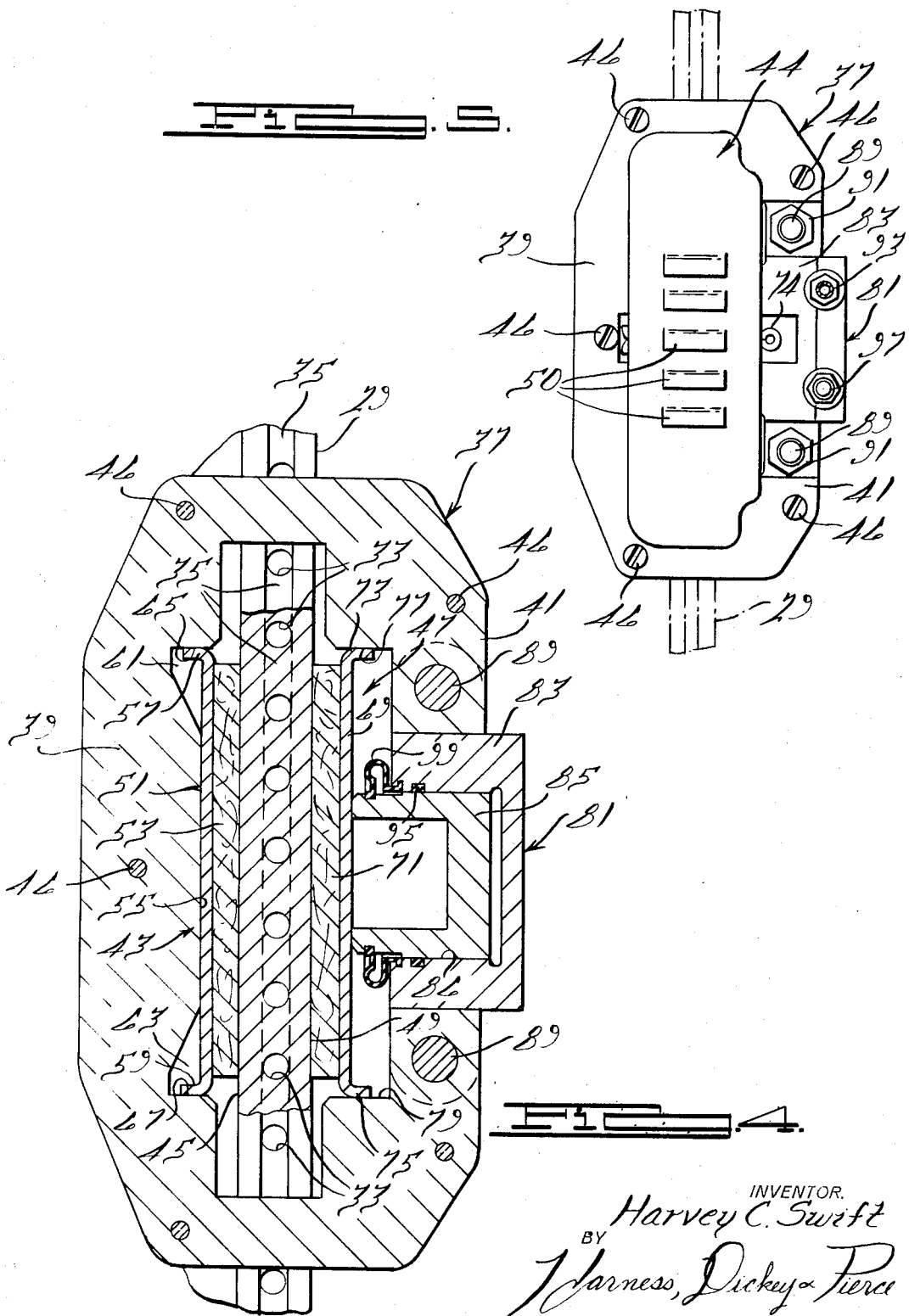
INVENTOR.
Harvey C. Swift
BY
Harness, Dickey & Pierce
ATTORNEYS

United States Patent Office 3,356,187
Patented Dec. 5, 1967

3,356,187
LINK SUPPORTED DISK BRAKE
Harvey C. Swift, Birmingham, Mich., assignor to Kelsey-Hayes Company, Romulus, Mich., a corporation of Delaware
Filed Apr. 25, 1966, Ser. No. 545,131
7 Claims. (Cl. 188—73)

ABSTRACT OF THE DISCLOSURE

A disk brake of the type having a caliper or reaction member which embraces a limited segment of the rotor. The reaction member carries a piston that presses one shoe against the rotor. The reaction member is movable axially of the rotor and this member moves to press a second shoe against the opposite side of the rotor. The reaction member is supported for such movement by two pairs of pivoted linkages. Depending upon the direction of rotor rotation, one linkage will elongate to impart self-energizing action to the shoes.

---

This invention relates generally to brakes, and particularly to an improved floating yoke disk brake construction.

An important object of the present invention is to provide a floating yoke disk brake having an improved yoke support and torque reaction construction.

A further object of the present invention is to provide a disk brake of the above character which is servo-like or self-energizing in operation.

Further objects of the present invention include the provision of a disk brake of the above character which is relatively inexpensive to manufacture, rugged in construction and reliable in use.

Other objects and advantages of the present invention will become more apparent from a consideration of the following detailed description taken in conjunction with the drawings in which:

FIGURE 1 is an elevational view, partly in section, illustrating a vehicle wheel embodying the present invention;

FIG. 2 is a sectional view of FIG. 1 taken along the 2—2 thereof;

FIG. 3 is a sectional view of FIG. 2 taken along the line 3—3 thereof;

FIG. 4 is a sectional view of FIG. 2 taken along the line 4—4 thereof; and

FIG. 5 is a diminished plan view of the disk brake illustrated in FIGS. 1, 2 and 4.

Broadly described, the present invention comprises a reaction member having spaced portions embracing an arcuate portion of a rotor that is rotatable about a central axis, a pair of brake shoe means nonrotatably carried by said reaction member and positioned between said rotor and a respective one of said reaction member portions, fluid motor means operatively interposed between one of said reaction member portions and an adjacent brake shoe means for moving said reaction member in one direction axially of said rotor and pressing both of said brake shoe means toward said rotor, a stationary support, linkage means interconnecting said reaction member and said support, said linkage means adapted to pivot in a plane generally parallel to the direction of braking forces acting on said reaction member and adapted to transmit torque from said reaction member to said stationary support, said linkage means pivoting in said plane and being effective to bias said reaction member in said one direction during said torque transmission.

Referring now more specifically to the drawings, a disk brake embodying the present invention is shown generally at 11 in FIGS. 1 and 2. The disk brake 11 is seen associated with a vehicle wheel which includes a wheel rim 13 having a web 15 secured by bolts 17 and nuts 19 to a radial flange 21 on a rotatable wheel spindle 23. A stationary support or axle tube 25 rotatably supports the spindle 23 through bearings 27 (only one of which is shown). A disk or rotor 29 is fixed to the axle 23 for rotation therewith and about a central axis by having a laterally offset flange 31 fixed to the axle flange 21 also by the bolts 17. The rotor 29 has a plurality of radially extending openings 33 therein separated by webs 35 which serve as fan blades to move cooling air through the openings 33 during turning movement of the rotor 29.

The disk brake 11 includes a reaction member or yoke 37 having spaced portions 39, 41 lying on oppostie sides of the rotor 29. A first brake shoe 43 is carried by the yoke 37 and is disposed between the yoke portion 39 and a radial face 45 on one side of the rotor 29. A second brake shoe 47 is also carried by the yoke 37 and is disposed between the portion 41 and another radial face 49 on the rotor 29 opposite the face 45. A shield 44 is fixed atop the yoke 37 by screws 46 and has a raised center area 48 provided with raised, inclined tabs 50 forming vent openings to permit cooling air moving through the rotor openings 33 to escape.

As shown best in FIG. 4, the brake shoe 43 includes a backing plate 51 having a brake lining 53 bonded or riveted thereto in the usual manner. The backing plate 51 is engaged by a generally flat projecting surface 55 on the yoke portion 39 and has a pair of right-angle flanges 57, 59, one at either end thereof, which are received in slots 61, 63 and slidably engaged with shoulders 65, 67, respectively, on the yoke portion 39.

The brake shoe 47 includes a backing plate 69 having a brake lining 71 bonded or riveted therto in the usual manner. Like the backing plate 51, the backing plate 69 has right-angle flanges 73, 75 engaging opposed shoulders 77, 79, respectively, on the yoke portion 41. Each of the brake shoe backing plates 51, 69 are supported by a cotter key 74 extending through openings 76, 78 in the backing plates 51, 69, respectively, and through openings 80, 82 in the shield 44.

A hydraulic motor, generally indicated at 81, is carried by the yoke 37 and is adapted to energize the disk brake 11. The motor 81 is seen to include a cylinder 83 having laterally extending flanges 84, 87 fixed to the yoke portion 41 by bolts 89 and nuts 91. A piston 85 is slidable in a bore 86 in the cylinder 83 and is engageable with the backing plate 69 of brake shoe 47.

To energize the disk brake 11, pressurized fluid is admitted to the cylinder bore 86 behind the piston 85 through a conduit 93 which interconnects the bore 86 and a conventional master cylinder (not shown). This causes the piston 85 to move toward the left, as seen in FIGS. 2 and 4, and presses the lining 71 of brake shoe 47 into tight frictional engagement with the rotor face 49. The reaction to this pressure acts on the end wall of the cylinder bore 86 and biases the yoke 81 toward the right as seen in the figures. This, in turn, acts on the brake shoe 43 and through engagement between the surface 55 of portion 39 and the backing plate 51, biases the lining 53 into tight frictional engagement with the rotor face 45 and the vehicle wheel is slowed or stopped.

When the pressure to the cylinder bore 86 is relieved, the forces on the piston 85 and the bore end wall also are relieved and the brake shoes 43, 47 are released from the rotor faces 45, 49, respectively. If desired, an annular seal 95 carried within the cylinder bore 86 and which sealingly engages the piston 85, may have a rectangular cross-sectional configuration. When the piston 85 and cylinder 83 move toward the left and right, respectively, during brake energization, the seal 95 is twisted or distorted so that upon relieving the pressure to the cylinder bore 86, the seal 95 assists in returning the piston 85 and cylinder 86 to their normal positions. A bleed fitting 97 communicates with the cylinder bore 86 for bleeding the hydraulic system. A flexible boot 99 has one end attached to the piston 85 and its other end to the cylinder 83 to prevent contamination of the hydraulic motor sliding surfaces.

According to the present invention, the yoke 37 is supported by the hub 25 for movement axially of the rotor 29 through a novel linkage means 101. As shown in FIGS. 1–3, the linkage means 101 includes a pair of identical articulated linkages 103, 104 oriented in reverse fashion relative to each other and each comprising a generally parallelogram-shaped link 105 pivotally secured at one end by a screw 107 to a flange 109 on the hub 25. The other end of the link 105 of each linkage 103, 104 is sandwiched between one end of a pair of generally L-shaped links 111, 113 and is pivoted thereto by a rivet 115. The other ends of the L-shaped links 111, 113 are pivotally secured to a boss 114 on the cylinder 83, each by a screw 117.

As shown best in FIG. 3, the linkages 103, 104 permit the yoke 37 to move freely in an axial direction relative to the rotor 29. Thus, as the yoke 37 moves toward the right, as seen in FIGS. 2 and 4, each of the linkages 103, 104 tends to straighten or elongate in a direction axially of the rotor 29, while left-hand directional movement of the yoke 37 causes these linkages to close or contract.

In use, the linkage means 101 transfers the torque developed on the yoke 37 during brake energization to the hub 25. In addition, the link means 101 is constructed to assist in biasing the yoke 37 toward the right as seen in FIGS. 2 and 4 during brake energization thereby making the disk brake 11 servo-like or self-energizing in nature. The torque developed on the yoke 37 arises from the fact that when the brake linings 53, 71 are pressed into tight frictional engagement with the rotor faces 45, 49 frictional forces try to move the brake shoes 43, 47 in the same direction the rotor 29 is turning. As seen in FIG. 4, the brake shoe backing plates 51, 69 are confined between the shoulders 65, 67 and 77, 79 on the yoke portions 39, 41, respectively, so that during brake energization, the yoke 37 is attempting to move in the direction of rotor turning.

Turning now to FIG. 3, it will be seen that torque on the yoke 37 imposes a force acting on the links 111, 113 at the screws 117 either upward or downward as viewed in the figure. If this force be acting downwardly, a downward force is exerted in the links 111, 113 of linkages 103, 104 causing the links 105 of each of the linkages 103, 104 to tend to pivot in a clockwise direction about their screws 107, respectively. Clockwise pivotal action of the link 105 of linkage 103 shifts the links 111, 113 of the linkage toward the right as seen in the figure assisting the action of the fluid pressure in the cylinder bore 86 and biases the yoke 37 toward the right as seen in FIGS. 2 and 4. This increases the total force biasing the lining 53 of brake shoe 43 toward the rotor face 45 and increases the braking effect imposed by the lining 53 on the rotor face 45. The tendency for clockwise pivotal movement of the link 105 of linkage 104 about the screw 107 is counteracted by the links 111, 113 of this same linkage pivoting in a clockwise direction about the rivet 115 so that in total effect, the linkage 104 simply reorients itself to accommodate the additional right-hand directional displacement of the yoke 37 realized from clockwise pivotal movement of the link 105 of linkage 103.

During reverse directional movement of the rotor 29, reverse action on the linkages 103, 104 takes place. Thus, in this case, the torque exerts an upward force on the links 111, 113 of linkages 103, 104 and tends to pivot the links 105 of linkages 103, 104 in a counterclockwise direction about their screws 107. Here, counterclockwise pivotal movement of the link 105 of linkage 104 shifts the links 111, 113 of this linkage toward the right as seen in FIG. 3 assisting the action of the fluid pressure in the cylinder bore 86 and again increases the total braking effect imposed by the brake lining 53 of shoe 43 on the rotor face. As was the case above, the tendency for the link 105 of linkage 103 to pivot counterclockwise about the screw 107 is overcome by counterclockwise pivotal movement of the links 111, 113 of this linkage so that the linkage 103 reorients itself to accommodate the increased displacement of the yoke 37.

In either direction of rotation then, torque developed on the yoke 37 serves to increase the braking effect of the lining 53 of brake shoe 43 on the rotor race 45 through the action of the linkage means 101. Since the pressure in the cylinder bore 86 remains the same, the braking effect of the lining 71 on the rotor face 49 remains substantially the same; however, the total braking effect of the linings 53, 71 on the rotor faces 45, 49 is increased.

In addition to possessing the servo-like or self-energizing properties described, the linkage means 101 is relatively inexpensive to manufacture because it does not require close manufacturing tolerances. Thus, this linkage means 101 provides a very desirable yoke supporting and torque transmitting construction.

By the foregoing, there has been disclosed an improved disk brake construction calculated to fulfill the inventive objects set forth above, and while a preferred form of the present invention has been illustrated and described above in detail, various additions, substitutions, modifications and omissions may be made thereto without departing from the spirit of the invention as encompassed by the appended claims.

What is claimed is:

1. A disk brake comprising a reaction member having spaced portions embracing an arcuate portion of a rotor that is rotatable about a central axis, a pair of brake shoe means nonrotatably carried by said reaction member and positioned between said rotor and a respective one of said reaction member portions, fluid motor means operatively interposed between one of said reaction member portions and an adjacent brake shoe means for moving said reaction member in one direction axially of said rotor and pressing both of said brake shoe means toward said rotor, a stationary support linkage means interconnecting said reaction member and said support, said linkage means adapted to pivot in a plane generally parallel to the direction of braking forces acting on said reaction member and adapted to transmit torque from said reaction member to said stationary support, said linkage means comprising a pair of linkages each of which is pivoted at its ends to said stationary support and said reaction members, respectively, one of said linkages being constructed to elongate in one direction when said fluid motor means is energized during movement of said rotor in one rotational direction, the other of said linkages being constructed to elongate in said one direction when said fluid motor means is energized during movement of said rotor in a reverse rotational direction.

2. A disk brake as defined in claim 1 wherein said linkages are substantially identical but are oriented in reverse fashion relative to each other.

3. A disk brake as defined in claim 1 wherein said linkages each includes first link means pivoted to said stationary support, second link means pivoted to said first link means and to said reaction member.

4. A disk brake as defined in claim 3 wherein said pivots of each said linkage are spaced from each other in a direction axially of said rotor.

5. A disk brake as defined in claim 3 wherein said pivot between said first and second link means of each said linkage is spaced from said other two pivots of each said linkage in a direction transverse to said rotor rotational axis.

6. A disk brake as defined in claim 3 wherein said first link means of each said linkage includes an elongated link, and said second link means of each said linkage includes a pair of generally L-shaped links which sandwich said elongated link.

7. A disk brake as defined in claim 3 wherein said second link means of each said linkage is generally L-shaped in configuration.

References Cited

UNITED STATES PATENTS

| 3,199,632 | 8/1965 | Chouings | 188—73 |
| 3,199,634 | 8/1965 | Chouings | 188—73 |

FOREIGN PATENTS

| 977,136 | 12/1964 | Great Britain. |
| 998,730 | 7/1965 | Great Britain. |

FERGUS S. MIDDLETON, *Primary Examiner.*

G. E. HALVOSA, *Assistant Examiner.*